United States Patent
Solomon (10) Patent No.: US 10,958,082 B2
(45) Date of Patent: Mar. 23, 2021

(54) INTELLIGENT BATTERY CYCLING FOR LIFETIME LONGEVITY

(71) Applicant: Microsoft Technology Licensing, LLC, Redmond, WA (US)

(72) Inventor: Oz Solomon, Maple (CA)

(73) Assignee: Microsoft Technology Licensing, LLC, Redmond, WA (US)

(*) Notice: Subject to any disclaimer, the term of this patent is extended or adjusted under 35 U.S.C. 154(b) by 350 days.

(21) Appl. No.: 15/962,148

(22) Filed: Apr. 25, 2018

(65) Prior Publication Data
US 2019/0334353 A1 Oct. 31, 2019

(51) Int. Cl.
*H02J 7/00* (2006.01)
*G06F 1/26* (2006.01)
*H01M 10/42* (2006.01)

(52) U.S. Cl.
CPC .......... *H02J 7/00036* (2020.01); *G06F 1/263* (2013.01); *H02J 7/0077* (2013.01); *H02J 7/0088* (2013.01); *H02J 7/00712* (2020.01); *H02J 7/007188* (2020.01); *H01M 10/4257* (2013.01)

(58) Field of Classification Search
CPC .............. H02J 7/00036; H02J 7/00712; H02J 7/007188; H02J 7/0077; H02J 7/0088; H02J 7/0069; H02J 7/0071; G06Q 10/06313; G06Q 10/06314; G06Q 10/04; G06F 1/263; G06F 1/30
USPC .............................................. 320/130; 307/66
See application file for complete search history.

(56) References Cited

U.S. PATENT DOCUMENTS

| | | | | |
|---|---|---|---|---|
| 5,939,864 A | * | 8/1999 | Lenhart | H02J 7/0071 320/137 |
| 6,046,574 A | * | 4/2000 | Baranowski | G01R 19/16542 320/132 |
| 6,664,764 B1 | * | 12/2003 | Odaohhara | G01R 31/3648 320/132 |
| 6,911,804 B2 | * | 6/2005 | Mori | G06F 1/263 320/132 |

(Continued)

FOREIGN PATENT DOCUMENTS

EP 2657062 A1 10/2013
JP 2013134550 A * 7/2013

OTHER PUBLICATIONS

Jary, Simon, "How to properly charge a phone battery", Retrieved From https://www.techadvisor.co.uk/how-to/mobile-phone/how-properly-charge-phone-battery-3619623/, Aug. 23, 2017, 4 Pages.

(Continued)

*Primary Examiner* — John T Trischler
(74) *Attorney, Agent, or Firm* — Holzer Patel Drennan (57) ABSTRACT

A system for intelligent cycling of a battery for improved lifetime longevity includes a charge interrupt predictor executable to predict a likelihood of a power source disconnect event interrupting a current flow to the battery within one or more segments of a future time interval. The system also includes a charge cycle model executable to model a charge cycle for the battery within the future time interval based on the charge interrupt prediction. The system further includes a charge cycling controller that controls battery circuitry to charge or discharge the battery in accord with the charge cycle model.

20 Claims, 5 Drawing Sheets

(56) References Cited

U.S. PATENT DOCUMENTS

| | | | |
|---|---|---|---|
| 7,633,265 B2* | 12/2009 | Matsushima | H02J 7/00 320/134 |
| 7,830,119 B2* | 11/2010 | Naik | H01M 10/48 320/132 |
| 8,022,674 B2 | 9/2011 | Miura | |
| 8,024,082 B2* | 9/2011 | Richter | B60L 53/30 701/22 |
| 8,086,364 B2* | 12/2011 | Xue | B60W 20/00 701/22 |
| 8,207,632 B2* | 6/2012 | Shimomura | H02J 9/062 307/64 |
| 8,421,414 B2* | 4/2013 | Lee | G06F 1/28 320/131 |
| 8,751,845 B2* | 6/2014 | Assad | G06F 1/329 713/340 |
| 8,805,523 B2* | 8/2014 | Single | A61N 1/3787 607/57 |
| 8,866,443 B2* | 10/2014 | Abe | G01R 31/367 320/132 |
| 8,907,629 B2* | 12/2014 | Kelty | B60L 58/13 320/132 |
| 8,970,173 B2 | 3/2015 | Kelty et al. | |
| 9,135,582 B2* | 9/2015 | Tadano | G05B 13/026 |
| 9,164,568 B2* | 10/2015 | Flores Assad | G06F 1/329 |
| 9,225,772 B2* | 12/2015 | Lui | G06F 9/505 |
| 9,350,190 B2* | 5/2016 | Iwamoto | H02J 7/0069 |
| 9,391,466 B2* | 7/2016 | Wang | H02J 7/0047 |
| 9,527,400 B2 | 12/2016 | Rhodes et al. | |
| 9,531,201 B2* | 12/2016 | Noh | H02J 7/0071 |
| 9,614,397 B2* | 4/2017 | Sonoda | H02J 7/1484 |
| 9,632,556 B2 | 4/2017 | Flores Assad et al. | |
| 9,705,817 B2* | 7/2017 | Lui | H04L 41/046 |
| 9,853,476 B2* | 12/2017 | Lee | G06F 1/26 |
| 9,867,017 B1* | 1/2018 | Bacarella | H04W 52/0258 |
| 9,955,313 B1* | 4/2018 | Bacarella | H04W 4/029 |
| 9,955,314 B1* | 4/2018 | Bacarella | H02J 13/0079 |
| 9,955,428 B1* | 4/2018 | Bacarella | H04W 4/025 |
| 10,223,156 B2* | 3/2019 | Chan | G06F 1/3206 |
| 10,298,026 B2* | 5/2019 | Trimboli | H02J 7/0016 |
| 10,389,592 B2* | 8/2019 | Lui | H04L 41/147 |
| 10,409,355 B2* | 9/2019 | Flores Assad | G06F 1/325 |
| 10,447,056 B2* | 10/2019 | Tamburrino | H01M 10/46 |
| 10,536,017 B2* | 1/2020 | Tu | H02J 7/0063 |
| 2004/0066171 A1* | 4/2004 | Mori | H02J 7/0071 320/132 |
| 2005/0156577 A1 | 7/2005 | Sully | |
| 2007/0145949 A1* | 6/2007 | Matsushima | H02J 7/00 320/132 |
| 2009/0015202 A1* | 1/2009 | Miura | B60W 20/00 320/132 |
| 2009/0058367 A1* | 3/2009 | Naik | H01M 10/48 320/136 |
| 2009/0066287 A1* | 3/2009 | Pollack | G06Q 50/06 320/101 |
| 2009/0200988 A1* | 8/2009 | Bridges | H02J 3/008 320/137 |
| 2010/0235025 A1* | 9/2010 | Richter | B60W 10/24 701/22 |
| 2010/0235030 A1* | 9/2010 | Xue | B60L 58/34 701/22 |
| 2010/0324848 A1* | 12/2010 | Cho | G01R 31/367 702/63 |
| 2012/0038312 A1* | 2/2012 | Abe | G01R 31/3842 320/101 |
| 2012/0317432 A1* | 12/2012 | Assad | G06F 1/3212 713/340 |
| 2013/0080641 A1 | 3/2013 | Lui et al. | |
| 2013/0099751 A1* | 4/2013 | Nishikawa | H02J 3/32 320/128 |
| 2013/0207611 A1* | 8/2013 | Sosnowski | H02J 7/0069 320/134 |
| 2013/0221916 A1* | 8/2013 | Kelty | B60L 58/24 320/109 |
| 2013/0221928 A1* | 8/2013 | Kelty | B60L 58/13 320/134 |
| 2014/0035514 A1* | 2/2014 | Wang | H04W 52/0248 320/107 |
| 2014/0253049 A1* | 9/2014 | Iwamoto | H02J 7/0069 320/162 |
| 2014/0289543 A1* | 9/2014 | Flores Assad | G06F 1/329 713/320 |
| 2014/0361745 A1* | 12/2014 | Nishita | B60L 55/00 320/109 |
| 2014/0366042 A1 | 12/2014 | Chan et al. | |
| 2015/0048803 A1* | 2/2015 | Noh | H02J 7/00036 320/155 |
| 2015/0188324 A1 | 7/2015 | Nicholson et al. | |
| 2015/0202984 A1* | 7/2015 | Wyatt | B60L 58/20 320/109 |
| 2015/0202985 A1* | 7/2015 | Le | B60L 58/22 307/9.1 |
| 2016/0006274 A1 | 1/2016 | Tu et al. | |
| 2016/0041598 A1* | 2/2016 | Flores Assad | G06F 1/3212 713/340 |
| 2016/0064960 A1* | 3/2016 | DiCarlo | H02J 7/0047 320/134 |
| 2016/0064961 A1* | 3/2016 | DiCarlo | H02J 7/007 320/157 |
| 2016/0112341 A1* | 4/2016 | Lui | H04L 43/0817 709/226 |
| 2016/0141893 A1* | 5/2016 | Lee | H02J 7/00036 320/107 |
| 2016/0221456 A1* | 8/2016 | Rhodes | B60L 58/26 |
| 2016/0336765 A1* | 11/2016 | Trimboli | H02J 7/0021 |
| 2017/0133863 A1* | 5/2017 | Tamburrino | H02J 7/342 |
| 2017/0249004 A1* | 8/2017 | Flores Assad | G06F 1/329 |
| 2017/0302521 A1* | 10/2017 | Lui | H04L 43/0817 |
| 2018/0106867 A1* | 4/2018 | Yun | G01R 31/367 |
| 2018/0115170 A1* | 4/2018 | Bacarella | H02J 7/0021 |
| 2018/0115871 A1* | 4/2018 | Bacarella | H02J 7/0071 |
| 2018/0115872 A1* | 4/2018 | Bacarella | H04W 4/029 |
| 2018/0115955 A1* | 4/2018 | Bacarella | H04W 52/0258 |
| 2018/0196092 A1* | 7/2018 | McBrearty | H02S 99/00 |
| 2018/0281774 A1* | 10/2018 | Fukuda | B60W 50/0097 |
| 2019/0226373 A1* | 7/2019 | Fukuda | B60W 10/06 |
| 2019/0317800 A1* | 10/2019 | Chan | H04L 67/2842 |
| 2020/0044926 A1* | 2/2020 | Lui | H04L 43/065 |
| 2020/0153253 A1* | 5/2020 | Tamburrino | H02J 7/0063 |

OTHER PUBLICATIONS

Linn, Allison, "A laptop battery system that knows your habits and lasts a lot longer", Retrieved From https://blogs.microsoft.com/ai/a-laptop-battery-system-that-knows-your-habits-and-lasts-a-lot-longer/, Oct. 2, 2015, 4 Pages Nield, David, "How to charge your devices the right way", Retrieved From https://www.popsci.com/charge-batteries-right, Aug. 23, 2017, 3 Pages.

"International Search Report and Written Opinion Issued in PCT Application No. PCT/US2019/026417", dated Jul. 15, 2019, 12 Pages.

* cited by examiner

INTELLIGENT BATTERY CYCLING FOR LIFETIME LONGEVITY

BACKGROUND

In many batteries, internal stresses vary with battery charge level. The total useable lifetime that a rechargeable battery is able to provide can be reduced by routine operation within "high stress" charge zones. Batteries of certain chemistries, such as lithium ion batteries, experience less stress when maintained within a medium-charge zone (e.g., around 50%) than when nearly drained (e.g., less than 10%) or when almost full (e.g., greater than 90%). Although useable battery lifetime is known to be extendable by maximizing the total time that a battery spends in lower stress charge zones (e.g., around 50% for some lithium-ion batteries), this motivation to reduce nominal battery charge level is often at odds with consumer demands for a battery to carry a maximum charge each time it is unplugged from a charging source.

SUMMARY

Implementations disclosed herein provide a system for intelligent battery cycling for increased battery longevity. According to one implementation, the system includes a charge interrupt predictor, a charge cycle modeler, and a charge cycling controller. The charge interrupt predictor makes a charge interrupt prediction that predicts a likelihood of a power source disconnect event interrupting charge flow to the battery within one or more future time intervals. The charge cycle modeler models a charge cycle for the battery for a derived time interval, where the charge cycle model includes an attempted charge level reduction to a first target zone prior to a charge level increase to within a second target zone. The charge cycling controller controls a battery circuitry to charge or discharge the battery in accord with the charge cycle model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other implementations are also described and recited herein.

DETAILED DESCRIPTIONS

Figure 1:
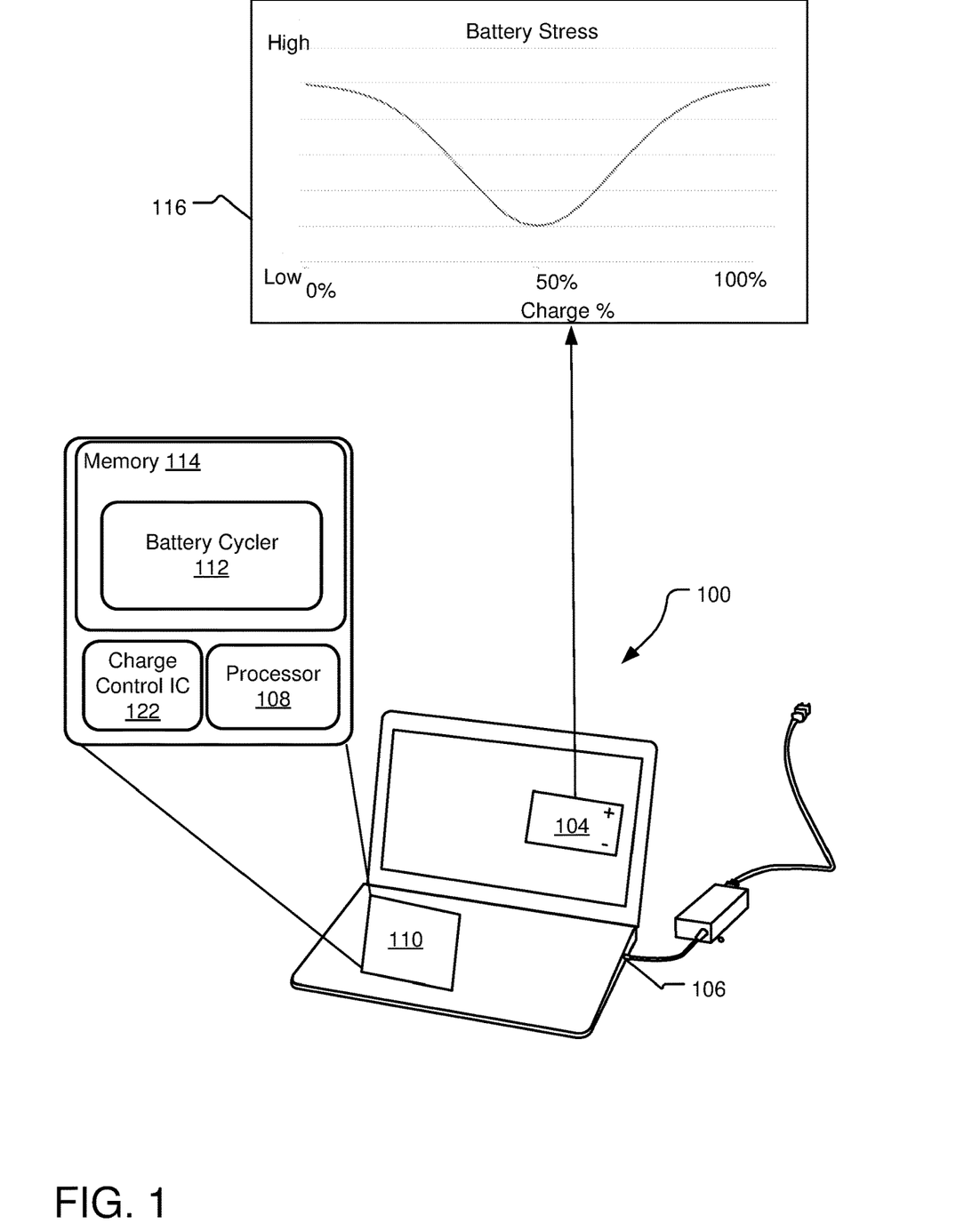
FIG. 1 illustrates an example electronic device that provides intelligent battery cycling for increased longevity of a rechargeable battery.

FIG. 1 illustrates an example electronic device 100 that provides intelligent battery cycling for increased longevity of a rechargeable battery (e.g., battery 104). As used herein, "longevity" of a battery refers to the total amount of time for which the battery 104 can be recharged and reused while maintaining capacity and voltage within standard operating parameters. For simplicity of concept, the electronic device 100 is shown to be a mobile electronic device (specifically, a laptop computer); however, the disclosed battery cycling technology may be implemented in a vast array of devices with rechargeable batteries including without limitation mobile devices such as tablets, mobile phones, watches, and larger battery-operated devices such as electric cars.

The electronic device 100 includes charge control IC 122, which meters current flow to charge the battery 104 when a charger 106 of the electronic device 100 is coupled to an external power source (not shown). The charge control IC 122 includes software and/or hardware (firmware) integrated within various locations such as within the charger 106, within the battery 104 (e.g., within a battery pack including the battery 104, a microprocessor, and a fuel gauge), on a printed circuit board (PCB) that supports the battery 104, or elsewhere within of the electronic device 100. In some implementations, the charge control IC 122 communicates with an operating system (not shown) and/or one or more applications (not shown) executing on the electronic device 100 to determine when and how much current to supply to the battery 104 based on conditions such as current charge state and current demands of load-drawing system electronics 110.

As a rechargeable battery ages, the battery 104 may hold less and less charge with time until finally replaced. When initially shipped from a manufacturer, the battery 104 may be rated for a set number (e.g., such as 2000) total charge cycles, meaning that it is expected that the battery 104 can be drained to 0% and recharged to 100% for the set number of charge cycles before its performance severely degrades. Field data has shown, however, that performance is also affected by factors unrelated to charge cycles, and that batteries frequently maintained in certain "high stress" charge zones may have much shorter longevity. Consequently, battery longevity can be extended by maximizing the time that the charge level of the battery 104 is maintained within identified low-stress charge zones.

Particular ranges of charge considered "high stress" vary widely between different types of batteries and even individual batteries of the same type, as stress is closely tied to individual battery characteristics. In FIG. 1, an exemplary plot 116 shows one example stress pattern for certain types of lithium-ion batteries, with some measurable battery-to-battery variations. The battery 104 experiences the lowest stress level when holding an approximate 50% charge but is subjected to much higher levels of stress when nearly drained (e.g., 0 to 10% charge) or when nearly full (e.g., 90 to 100% charge).

Although the battery 104 may have extended longevity when habitually maintained in the lower stress (e.g., 50% charge zone), a battery that is unplugged from a power source in a lower stress state (e.g., 50%) may become depleted and require recharge much sooner than the same battery that is unplugged from the power source when in a high-charge (e.g., 90%) higher stress state. For this reason, a user prefers the battery 104 to be at or near maximum charge capacity (100%) whenever the battery 104 is decoupled from the power source for portable use. Thus, user preferences for extended single-charge usage time are at odds with competing market demands for a durable battery that provides high lifetime longevity.

To balance these competing demands, the electronic device 100 includes a battery cycler 112 that intelligently cycles the battery 104 while the charger 106 is connected to a power source so as to maximize total time that the battery 104 spends in lower-stress charge zones while still exhibiting an acceptably high charge state (e.g., such as greater than 90%) each time the user unplugs the electronic device 100 for portable use.

The battery cycler 112 includes computer-readable instructions (software) and may, in some implementations, include a combination of software and hardware (not shown). In FIG. 1, the battery cycler 112 is shown stored locally in memory 114 of the electronic device 100 for local execution by a processor 108; however, in other implementations, some or all aspects of the battery cycler 112 may be stored and/or executed at locations that are remote from the electronic device 100, such as on a remote server that communicates with the electronic device 100 via an internet connection.

In general, the battery cycler 112 gathers various types of data to predict when the electronic device 100 is likely to be unplugged from the external power source. The interrupt of current flow between an external power source and the battery 104 is referred to herein as a "power source disconnect event." In addition to predicting power source disconnect event information, the battery cycler 112 takes actions to cycle the battery 104 down into a lower-stress charge level at times when a power source disconnect is deemed unlikely and back into a higher-stress, high-charge level at times when the power source disconnect is deemed more likely.

According to one implementation, the battery cycler 112 includes a charge interrupt predictor (not shown) that intelligently predicts power source disconnect events by analyzing device data (such as device charge history, calendar data, and/or location data) to make inferences about a user's charge/discharge habits. Each prediction of the charge interrupt predictor includes, for example, a likelihood of a power source disconnect event occurring within certain identified time intervals. The battery cycler 112 models one or more charge cycles for a period of time that includes one or more predicted power source disconnect event. Each modeled charge cycle drops the charge of the battery 104 down into a target low-stress charge zone for a period of time and then begins increasing the charge level at a select time to ensure that the charge level has time to rise all the way into a target high-charge zone by the time of the predicted power source disconnect event. For example, the target high-charge zone may include a range of charges between 90 and 100% of a maximum charge for the battery 104. Based on state parameters of the modeled charge cycle and various parameters of the charge interrupt prediction, the battery cycler 112 determines whether or not to begin discharging and charging the battery 104 in accord with the modeled cycle.

Notably, a number of variables complicate the predictions of both power source disconnect events and charge modeling. Users may not habitually connect or disconnect the battery 104 at the same times each day, and battery charge/discharge rates are difficult to model accurately due to unpredictability in how the electronic device 100 may be used throughout a future time interval. In some cases, the battery cycler 112 may begin discharging the battery 104 (based on the predictions and modeling described above) and detect an unexpected power source disconnect event at an unexpected time, such as when the charge level of the battery 104 is well outside of the target high-charge zone. In other cases, actual charge or discharge rates may be slower than predicted due to heavy or light computing use of the electronic device 100, ultimately preventing the battery 104 from reaching one or both of the target low-stress charge zone and the target high-charge zone during an adopted charge cycle.

When certain machine learning solutions are leveraged, the battery cycler 112 may learn from the above-described failure scenarios and dynamically improve its modeling and decision-making logic over time. According to one implementation, the battery cycler 112 utilizes a machine learning algorithm, such as a neural network or reinforcement learning, to improve the charge interrupt prediction and a reinforcement learning algorithm for improving charge cycle modeling, and/or decision-making logic over time. For example, the battery cycler 112 may receive positive feedback from the system 100 each time a power source disconnect event occurs when the battery 104 has a charge that is within a target high-charge zone at the disconnect time. Likewise, the battery cycler 112 may receive negative feedback from the system 100 each time a power source disconnect event is detected at a time when the battery 104 is not charged to within the target high-charge zone at disconnect time (e.g., greater than 90%). This feedback causes the battery cycler 112 to tune various parameters associated with decision-making logic over time, as described in more detail with respect to FIG. 3 below.

Ultimately, this controlled battery cycling based on predictive modeling has the effect of extending the longevity of the battery 104 by maximizing a time that the battery 104 is maintained in a low-stress state, while still providing a fully-charged battery to the user the vast majority of the times when the electronic device 100 is unplugged for portable use.

Figure 2:
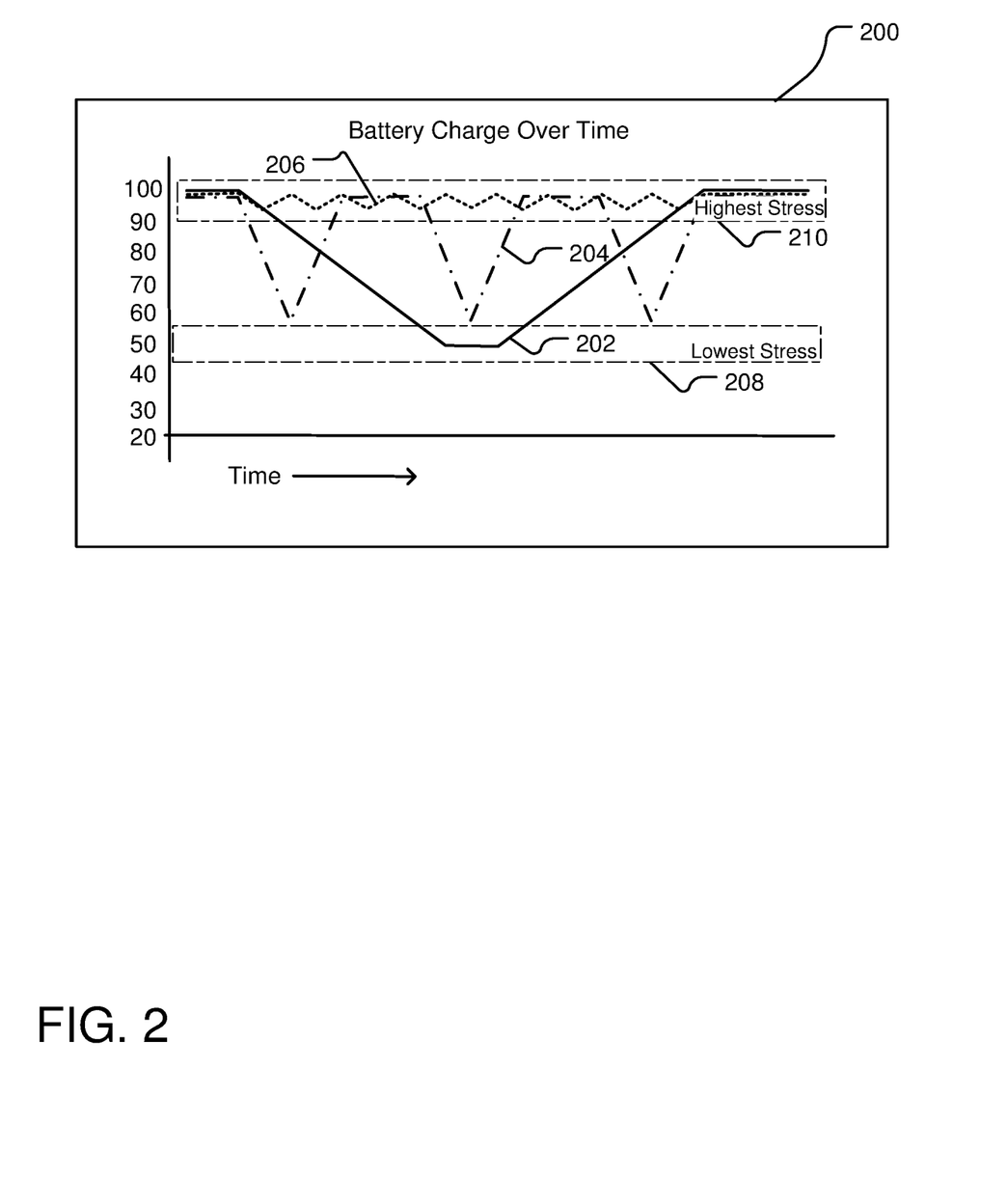
FIG. 2 illustrates a plot showing example charge cycles for good and poor battery health of one example battery.

FIG. 2 illustrates a plot 200 showing example charge cycles 202, 204, and 206 for good and poor battery health of one example battery. As mentioned above with respect to FIG. 1, different batteries may experience stress in different charge zones, some stress sometimes causing swelling due to the expansion and contraction of materials within the battery cell. In the example of FIG. 2, the battery experiences lowest stress when holding a charge that falls within a low-stress charge zone 208 (e.g., a first target zone), between approximately 45 and 55% of a maximum battery charge. In contrast highest stress is observed in a high-stress charge zone 210 (e.g., a second target zone), between approximately 90 and 100% of total charge capacity. For other batteries, one or both of the low stress charge zone 208 and the high-stress charge zone 210 may be higher or lower as well as wider or narrower than that shown.

In general, battery health can be improved by maximizing a total amount of time that a battery charge is maintained within the low stress charge zone 208, while simultaneously minimizing the number of charge cycles it takes to do so. Rapid and frequent increases and decreases in charge can be harmful to battery health—particularly if they occur in within the high-stress charge zone 210.

In FIG. 2, the example charge cycle 202 represents a healthy charge cycle for the example battery. Here, a single charge cycle (e.g., discharge to a minimum followed by charge to a maximum) occurs over an illustrated time interval. Once the battery is discharged to a minimum within the low-stress charge zone 208, the battery is maintained in the low-stress charge zone 208 for a period of time before the charge level is steadily increased.

In contrast to the charge cycle 202, the example charge cycle 204 may represent a less healthy charging pattern for the same battery. In this case, the battery charge level never fully reaches the low-stress charge zone 208. Also, the frequent charge/discharge pattern leads to a degradation of the battery chemistry.

In contrast to the charge cycles 202 and 204, the example charge cycle 206 represent a least healthy charging sequence for the battery. Here, the battery is exclusively maintained within the high-stress charge zone 210 and the battery is subjected to several charge and discharge fluctuations within the high-stress charge zone 210, making cycle 206 worse than simply keeping the battery at 100% charge.

According to one implementation, the herein disclosed technology provides for an intelligent battery cycler that executes logic to intelligently cycle a device battery while the battery is coupled to a charging source. The battery cycler predicts power source disconnect events and implements logic to realize two competing goals—(1) ensuring the battery is within a target high-charge zone (which may mirror the high-stress charge zone 210) when disconnected from an external power source; and (2) minimize stress on the battery, such as by maximizing a total amount of time that the battery is maintained within the low-stress charge zone 208 and minimizing a total number of cycle fluctuations between high and low stress charge zones. In one example implementation, the battery cycler attempts to model the charge cycle 202 as often as possible, while actively avoiding charge cycles such as 206 or even 204.

Figure 3:
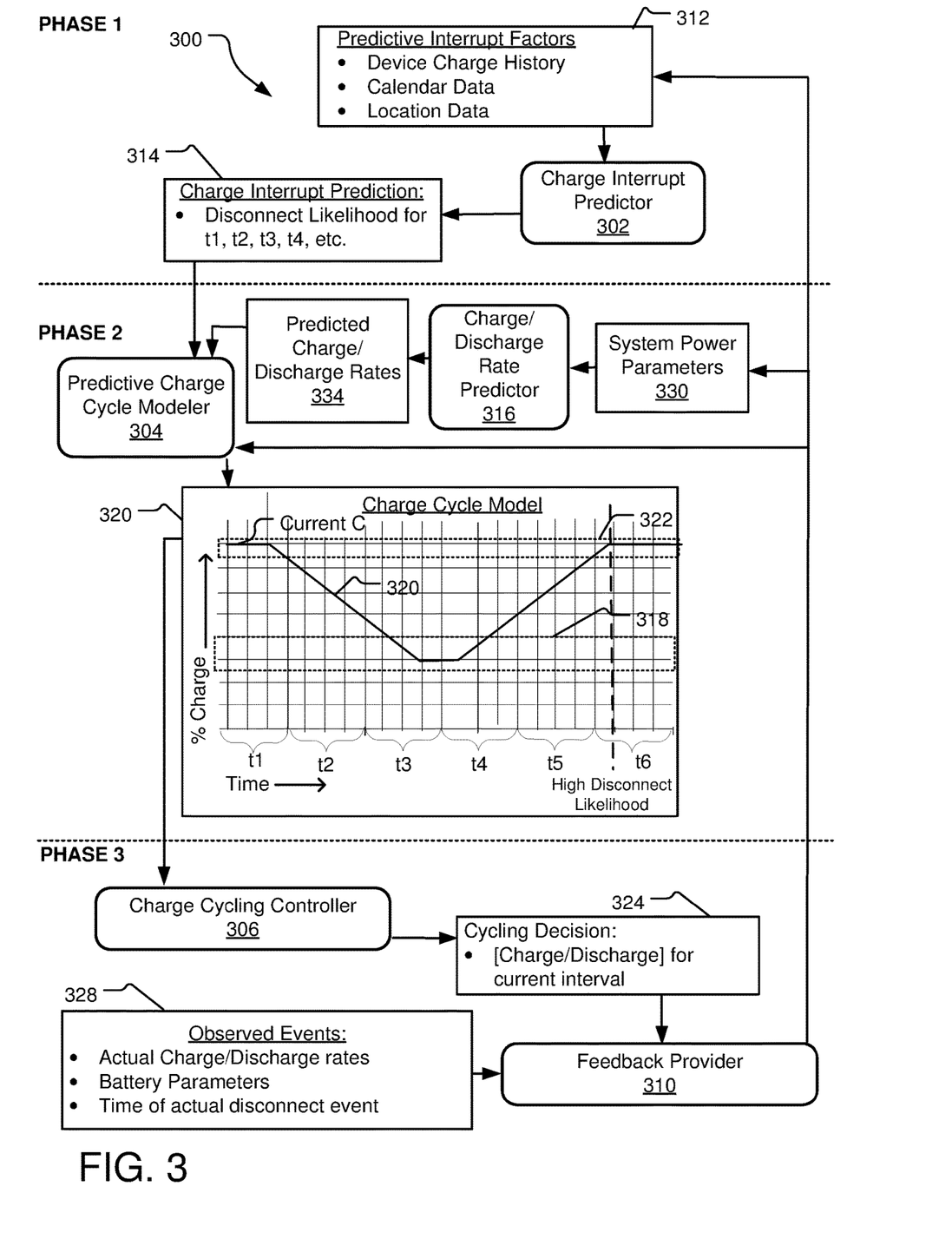
FIG. 3 illustrates an example battery cycle that implements logic for intelligently cycling a battery while the battery is connected to a power source.

FIG. 3 illustrates an example battery cycler 300 that implements logic for intelligently cycling a battery while the battery is connected to a power source. In one implementation, the battery cycler 300 is the same or similar to that described above with respect to FIGS. 1-2. In one implementation, the battery cycler 300 includes computer-executable instructions locally stored in memory on an electronic device supported by the battery. For example, the computer-executable instructions are executable as part of an operating system or an independent application. In many of the examples below, the battery cycler is discussed as executing on a computer, such as a laptop used for work. In other implementations, the battery cycler 300 executes on other types of electronic devices including without limitation those listed with respect to FIG. 1, above.

The battery cycler 300 is configured to control battery circuitry to actively increase and decrease a current battery charge level to balance two competing goals: (1) ensuring the battery is within a target high-charge zone when disconnected from a power source; and (2) minimizing battery stress through efforts such as maximizing time that the battery spends within a target low-stress charge zone while simultaneously mitigating a total number of cycles incurred. In one implementation, the battery circuitry includes a microprocessor within a device charger that meters current into the electronic device in accord with instructions received from a battery cycler 300 and/or a battery pack coupled to the battery. The battery may, for example, be integrated within a battery pack including a fuel gauge that collects battery parameters and a microprocessor that transmits those parameters to one or both of the battery cycler 300 and device charger.

The battery cycler 300 includes several sub-modules (e.g., a charge interrupt predictor 302, a charge/discharge rate predictor 316, a predictive charge cycle modeler 304, a charge cycling controller 306, and a feedback provider 310) that perform various tasks shown as corresponding to logic executed in accord with three distinct phases—Phase 1, Phase 2, and Phase 3—of logic performed to initiate a battery charge cycle (e.g., a period of discharge followed by charge).

During Phase 1 of the battery charge cycling logic, the charge interrupt predictor 302 uses one or more predictive interrupt factors 312 to generate a charge interrupt prediction 314. In general, the charge interrupt prediction 314 provides predictive information pertaining to a likelihood of a power source disconnect event. In the implementation of FIG. 3, the charge interrupt predictor 302 predicts a likelihood of a power source disconnect event (referred to herein after as a "disconnect likelihood") corresponding to each of multiple sequential subintervals (e.g., t1, t2, t3, t4, etc.) spanning a future time interval. Since the predictions for each subinterval depend on real-time factors that change over time, the disconnect likelihood of each of the subintervals may change dynamically with iterative renditions of the charge interrupt prediction 314 performed at various times throughout the future time interval.

In different implementations, the future time interval associated with the charge interrupt prediction 314 may vary in length as well as the individual subintervals (t1, t2, t3, t4, etc.). In one implementation, the subintervals of the charge interrupt prediction 314 each correspond to a 15-minute window and collectively comprise the future time interval corresponding to a multi-hour time block, such as a four-hour future time window. For example, the charge interrupt predictor 302 generates a probability representing the disconnect likelihood for each 15-minute interval between 8 am and noon. As the subintervals tick by in real-time, the future time interval remains of static length (e.g., four hours in this example) such that each iterative prediction rendered includes disconnect likelihood predictions for new time-sequential subintervals further into the future.

In different implementations, the charge interrupt predictor 302 may generate the charge interrupt prediction 314 based on different combinations of the predictive interrupt factors 312 or other factors. In one implementation, the charge interrupt predictor 302 uses device charge history (e.g., time and date information corresponding to previous power source connect and disconnect events) to infer one or more charging habits of a user that are then used as a basis to generate the charge interrupt prediction 314. For example, the charge interrupt predictor 302 may access device charge history to determine that the electronic device is routinely disconnected from the power source between 5 and 6 pm (e.g., when the user packs up his laptop and leaves the office) on each day Monday through Friday. Likewise, device charge history may indicate that the device is routinely disconnected from the power source for the same hour on the third Wednesday of each month when the user has a particular meeting.

In some implementations, the charge interrupt predictor 302 utilizes calendar data as inputs for generating the charge interrupt prediction 314. For example, calendar data may inform the charge interrupt predictor 302 that today is a holiday from which it may be inferred that there exists a lower likelihood that the electronic device is to be used or unplugged. Calendar data may, in some cases, supplement device charge history. If, for example, calendar data indicates that last Monday was a holiday, the charge interrupt predictor 302 may analyze or use the charge history collected last Monday differently than the charge history collected for other Mondays since the user's work behavior may have been atypical on this day. Likewise, calendar data may provide the charge interrupt predictor 302 with the dates and times of scheduled meetings, which the charge interrupt predictor 302 may recognize as times that the device is likely to be disconnected from the external power source.

In still other implementations, the charge interrupt predictor 302 utilizes location data to generate the charge interrupt prediction 314, either alone or in combination with calendar data and/or device charge history. For example, device location data may indicate whether the user is at work, home, or a public location (e.g., a coffee shop or public library). If, for example, the electronic device is at the user's home, the charge interrupt predictor 302 may determine that a power source disconnect event is less likely to occur during the day than when the device is at the user's work location. Likewise, a public location—such as coffee shop—may signify a period of temporary use that correlates with a high likelihood of a power source disconnect event within the near future.

In some implementations, the charge interrupt predictor 302 may include a neural network or other types of machine learning algorithms to intelligently generate the charge interrupt prediction 314 based on the plurality of known predictive interrupt factors 312.

During Phase 2 of the cycling logic implemented by the battery cycler 300, the predictive charge cycle modeler 304 models a charge cycle (e.g., an exemplary charge cycle model 320) for the battery within the future time interval corresponding to the charge interrupt prediction 314. In general, the predictive charge cycle modeler 304 models each charge cycle to best serve the two primary goals set forth above: (1) ensuring that the charge level of the battery is within to target high-charge zone 322 when the battery is most likely to be disconnected; and (2) minimizing battery stress, such as by maximizing the total time that the battery spends within a target low-stress charge zone 318 without incurring excessive charge cycles.

The charge cycle model 320 pertains to an exemplary time period for which there exists a high disconnect likelihood toward the end of the future interval (e.g., within a subinterval t6). In this example, the charge cycle model 320 includes a reduction in the charge level of the battery from a current charge level of the battery ("Current C") to a local minimum in the target low-stress charge zone 318, followed by an increase in the charge level to a target high-charge zone 322 just prior to a time of the high disconnect likelihood.

The predictive charge cycle modeler 304 generates the charge cycle model 320 based on the charge interrupt prediction 314 and also based on predicted charge/discharge rates 334, which are generated by the charge/discharge rate predictor 316. The predicted charge/discharge rates 334 may vary over time and depend heavily upon how the electronic device is used (the system load). If the electronics perform intense processing activities (e.g., to render video game graphics) or other power-hungry activities (such as acceleration in an electric vehicle), the battery may charge at a slower rate and discharge at a faster rate than at times when the system load is low.

The charge/discharge rate predictor 316 predicts the charge/discharge rates 334 based on system power parameters 330 received as input. The system power parameters 330 may, for example, include the current battery charge (e.g., as measured by a fuel gauge within the battery pack), the system load, as well as factors such as the current battery temperature, the age of the battery and the battery type.

In different implementations, the charge/discharge rate predictor 316 may predict the charge/discharge rates 334 in different ways. In a more simplistic implementation, the charge/discharge rate predictor 316 utilizes an average power draw by the system load over a previous time interval, such as the past one hour, to compute the predicted charge and discharge rates for the battery during the modeled future time interval. In other implementations, the charge/discharge rate predictor 316 makes a more intelligent determination of the charge/discharge rates 334 over the future time interval, such as relying on device history, calendar data, and/or device location data to make inferences about specific charge and discharge rates that are likely to be observed over the future time interval. For example, the charge/discharge rate predictor 316 may look at patterns of use history and corresponding power demands for time periods similar to the future time interval. If, for instance, the device typically performs intense processing activity on Saturday afternoons (e.g., when the user plays video games on the device), the charge/discharge rate predictor 316 may determine that the power demands are likely to be higher on Saturday afternoons than at other times.

As discussed further below, the charge cycle model 320 is dynamically updated throughout the future time interval, such as in response to changes to the predictive interrupt factors 312. In one implementation, the charge interrupt prediction 314 and predicted charge discharge rates 334 are updated at the conclusion of each subinterval (t1, t2, t3, etc.). For example, the charge interrupt predictor 302 generates an updated charge interrupt prediction 314 at predetermined intervals or in response to detection of changes in one or more of the predictive interrupt factors 312 (e.g., one or more newly detected power connect/disconnect events, changes in location, or newly added or deleted calendar events). Similarly, the charge/discharge rate predictor 316 generates updated predicted charge/discharge rates 334 at predetermined intervals in response to changes detected in one or more of the system power parameters 330.

In some instances, the predictive charge cycle modeler 304 is unable to generate a viable charge cycle model that reduces stress on the battery without putting the battery at risk of carrying an insufficient charge at a time of high disconnect likelihood. In these cases, the predictive charge cycle modeler 304 may produce a model that drops the charge as close as possible to the target low-stress charge zone 318 while still probabilistically ensuring that the charge level returns to the target high-charge zone 322 in time for each anticipated power source disconnect event. For example, the predictive charge cycle modeler 304 may decide to drop the charge level to a local minimum of 70% for a few hours even if 70% is outside of the target low-stress charge zone 318 (e.g., 50-60% in some implementations).

In some cases, the predictive charge cycle modeler 304 is unable to output a viable charge cycle model. For instance, the predictive charge cycle modeler 304 may determine that there is insufficient time and/or inadequate confidence in the system ability to reduce the battery charge out of a defined high-charge zone in time to re-charge in preparation for a time corresponding to a high disconnect probability. In such cases, the predictive charge cycle modeler 304 may output an error (e.g., "no viable model") or generate other output indicating a null result.

During Phase 3 of the cycling logic implemented by the battery cycler 300, the charge cycling controller 306 makes a cycling decision 324 based on the charge cycle model 320 that pertains to the current subinterval. For example, if the current time is the start of the subinterval "t1," the charge cycling controller 306 determines whether to charge or discharge the battery for the interval t1 and also selects the corresponding rate of charge or discharge based on the charge cycle model 320. In cases where the predictive charge cycle modeler 304 is unable to generate a viable model, the charge cycling controller 306 may elect to continue charging at a default rate, such as 100%.

Based on the cycling decision 324, the charge cycling controller 306 controls battery circuitry to begin either charging or discharging the battery at a rate corresponding to the modeled rate for the associated time subinterval of time during the future time interval spanned by the charge cycle model 320.

Responsive to each cycling decision 324, a feedback provider 310 observes actual events and compares the actual events to the outcomes predicted by the charge cycle model 320 and/or an ideal battery cycle. Based on these observations, the feedback provider 310 provides negative or positive feedback to predictive charge cycle modeler 304, and the predictive charge cycle modeler 304 uses such feedback to refine the logic on which the charge cycle model 320 is generated.

In different implementations, negative and positive feedback may be provided in a number of different ways. In one implementation, the feedback provider 310 provides negative or positive feedback to the predictive charge cycle modeler 304 responsive to each detected power source disconnect event. In cases where the battery is within the target high-charge zone 322 at the time of the power source disconnect event, the feedback provider 310 provides positive feedback to the predictive charge cycle modeler 304. In cases where the battery is not within the target high-charge zone 322 at the time of the power source disconnect event, the feedback provider 310 provides negative feedback to the predictive charge cycle modeler 304. Feedback may also be dependent upon other factors, such as the time that the battery spends in the target low-stress zone 318 for each cycle and/or the number fluctuations in charge level in and out of the target high-charge zone 322 in a given time interval.

In some implementations, the relative magnitude of the feedback provided may vary based on the degree of the disparity between the charge level at the time of the power source disconnect event and the target high-charge zone 322. If, for example, the battery charge level is 5% below the target high-charge zone 322 at the time of the power source disconnect event, the feedback provider 310 may provide a small amount of negative feedback (e.g., a feedback value of −1) to the charge cycling controller 306. In contrast, the feedback provider 310 may provide negative feedback values of larger magnitude for larger disparities of this nature (e.g., such as providing a feedback value of −2 if this disparity is between 10-20% off target and a feedback value of −3 if this disparity is greater than 30% off target).

Likewise, the relative magnitude of the feedback may also depend on the amount of time that the battery spends in the target low-stress charge zone 318 and/or the number of times that the battery is cycled to and from the target high-charge zone 320 in a given time period. For example, the feedback provider 310 may increase the magnitude of positive feedback when the battery spends a longer time in the target low-stress charge zone 318 and/or increase the magnitude of negative feedback when the battery incurs excessive charge cycles to and from the target high-charge zone 322 within a given time interval.

Responsive to each instance of negative or positive feedback, the charge cycling controller 306 refines its understanding of how the various combinations of modeled state parameters and device state parameters correlate with successful and unsuccessful attempts to achieve the two system goals of cycling the battery down to the target low-stress charge zone 318 while ensuring that the battery charge level is within the target high-charge zone 322 each time a power source disconnect event is actually observed. As the understanding of these correlations improves, so too does the consistent capability of the battery cycler 300 to achieve such goals.

In addition to providing negative and positive feedback to the predictive charge cycle modeler 304, the feedback provider 310 (or other system mechanism) continuously updates the predictive interrupt factors 312 and system power parameters 330 based on the observed event data 328. In one implementation, the feedback provider 310 retrieves system state information and updates the predictive interrupt factors 312 and system power parameters 330 at the conclusion of each subinterval (t1, t2, t3, t4, etc.). From this information, the charge interrupt prediction 314 and predicted charge/discharge rates 334 are updated and the charge cycle model 320 is modified based on the updated inputs.

In some cases, the updated system power parameters 330 (e.g., the actual charge and discharge rates detected) may deviate from the predicted charge/discharge rates 334. If the system power demands are higher than anticipated, the discharge and charge of the battery may occur more slowly than predicted by the charge cycle model 320. Likewise, if system power demands are lower than anticipated, the discharge and charge of the battery may occur more quickly than predicted.

The continuous provisioning of feedback pertaining to the observed events 328 allows the battery cycler 300 to continuously refine the charge cycle model 320, such at the conclusion of each subinterval. In this way, the strategy of the predictive charge cycle modeler 304 may continuously evolve to ensure best compliance with its two primary objectives (e.g., ensuring charge in the target high-charge rate zone 322 at times with a high disconnect likelihood and minimize stress on the battery).

Notably, the individual conditions for providing positive and negative feedback as well as the magnitude of such feedback may vary significantly between different implementations that each suffice to train the charge cycling controller 306 to improve cycling decision logic over time.

Figure 4:
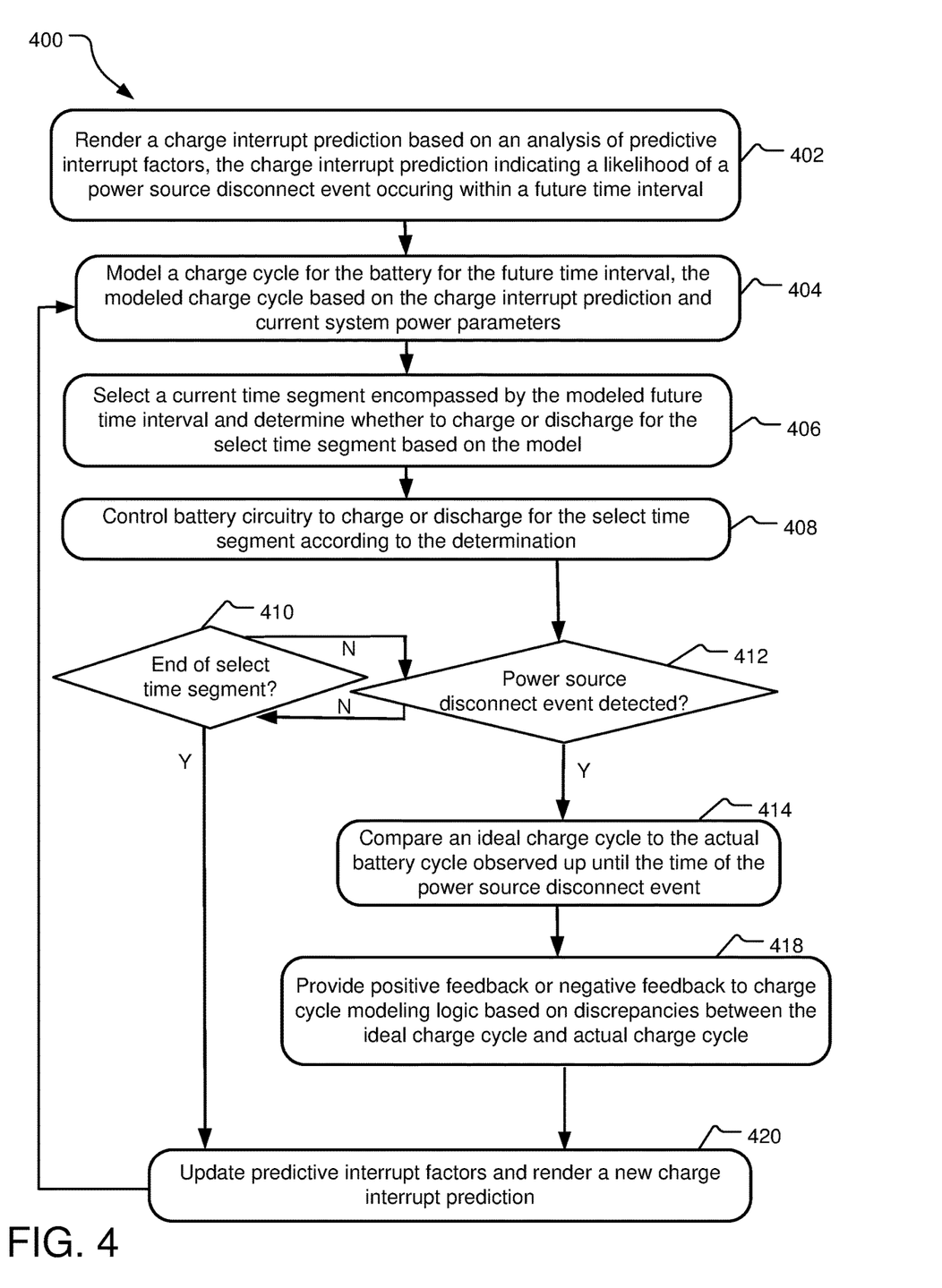
FIG. 4 illustrates example operations for intelligently cycling a battery while the battery is connected to a power source.

FIG. 4 illustrates example operations 400 for intelligently cycling a battery while the battery is connected to an external power source. A rendering operation 402 renders a charge interrupt prediction based on an analysis of predictive interrupt factors, such as device charge history, calendar data, and/or location data. The charge interrupt prediction includes at least a predicted likelihood of a power source disconnect event disrupting a flow of charge to the battery within a future time interval. In one implementation, the charge interrupt prediction includes a predicted likelihood of a power source disconnect event occurring in each of several subintervals spanning the future time interval. In another implementation, the charge interrupt prediction includes a predicted time of a next power source disconnect event.

A modeling operation 404 models a charge cycle for the battery for the future time interval. The model is based on logic for implementing two goals—first, minimizing stress on the battery; and second, ensuring that the battery is within a target high-charge zone when a power source disconnect event actually occurs. When feasible (e.g., consistent with these goals), the modeled charge cycle includes a reduction in the charge level of the battery down to a target low-stress zone followed by an increase in the charge level to the target high-charge zone. The modeled charge cycle is based on modeling logic that analyzes the charge interrupt prediction in conjunction with various system power parameters as well as predicted charge and discharge rates based on those power parameters.

A selection and determination operation 406 selects a current time segment encompassed by the modeled future time interval and determines, based on the charge cycle model, whether to charge or discharge the battery for the select time segment. A battery control operation 408 controls the battery circuitry to charge or discharge the battery for the select time segment according to the determination.

A determination operation 412 determines whether a power source disconnect event is detected during the time interval. If a power source disconnect event is not detected then a determination operation 410 determines that the select time segment has ended, a parameter update operation 420 updates the predictive interrupt factors based on newly-available system information and a new charge interrupt prediction is rendered based on the updated parameters. In this case, the modeling operation 404 again models the predicted charge cycle for the battery over the future time interval based on the updated charge interrupt prediction and current system power parameters (e.g., parameters which may have changed since the previous iteration of the model). The selection and determination operation 406 selects a next time segment (e.g., the now current time segment) encompassed by the model and again determines whether to charge or discharge for the select time segment based on the model.

In the event that a power source disconnect event is detected by the determination operation 412, a comparing operation 414 compares an "ideal" charge cycle to the actual battery cycle observed up until the time of the power source disconnect event to identify discrepancies. The ideal charge cycle is, for example, a charge cycle that the modeling operation 404 would construct if all inputs to the model were known rather than probabilistic (e.g., as in the charge interrupt prediction and predicted charge and discharge rates). A feedback provisioning operation 418 provides either positive or negative feedback to charge cycle modeling logic of the modeling operation 404 based on discrepancies between the ideal charge cycle and the actual charge cycle. In different implementations, feedback may be provided differently and/or based on different considerations.

In one implementation, the comparing operation 414 determines whether the battery charge level was within the target high-charge zone at the time that the power source disconnect occurred. If the battery charge level was within the target high-charge zone at the time of the power source disconnect event, the feedback operation 418 provides positive feedback (e.g., via a reinforcement learning algorithm) to the charge cycle modeling logic utilized by the modeling operation 404. If, in contrast, the battery charge level was not within the target high-charge zone at the time of the power source disconnect event, the feedback operation 418 provides negative feedback to the charge cycle modeling logic.

Feedback may be additionally or alternatively provided based on the amount of time that the battery spends within the target low-stress charge zone. For example, high amounts of feedback may be provided when the battery spends a longer duration in the target low-stress charge zone during the actual battery cycle. In contrast, a lesser amount of positive feedback may be provided when the battery spends a shorter time in the target low-stress charge zone and an even lesser amount of feedback (e.g., negative feedback) may be provided if the battery does not reach the target low-stress charge zone during the actual cycle).

In another implementation, feedback is provided to the charge cycle modeling logic based on the number of charge level fluctuations in and out of the target high charge-level zone during the actual battery cycle. For instance, a highest amount of feedback may be provided when this level of fluctuations is small (e.g., one fluctuation out of the high-level charge zone and one back into the high-level charge zone) while a smaller amount of feedback may be provided when the number of fluctuations is larger.

After the provisioning of feedback, the parameter update operation 420 updates the predictive interrupt factors and renders a new charge interrupt prediction that is, in turn, used by the modeling operation 404 to update the model for the future time interval. In this manner, the battery is continuously charged or discharged in accord with the charge cycle model, the charge cycle model is continuously updated based on dynamic updates to the charge interrupt prediction and power parameters and associated predicted charge/discharge rates.

Figure 5:
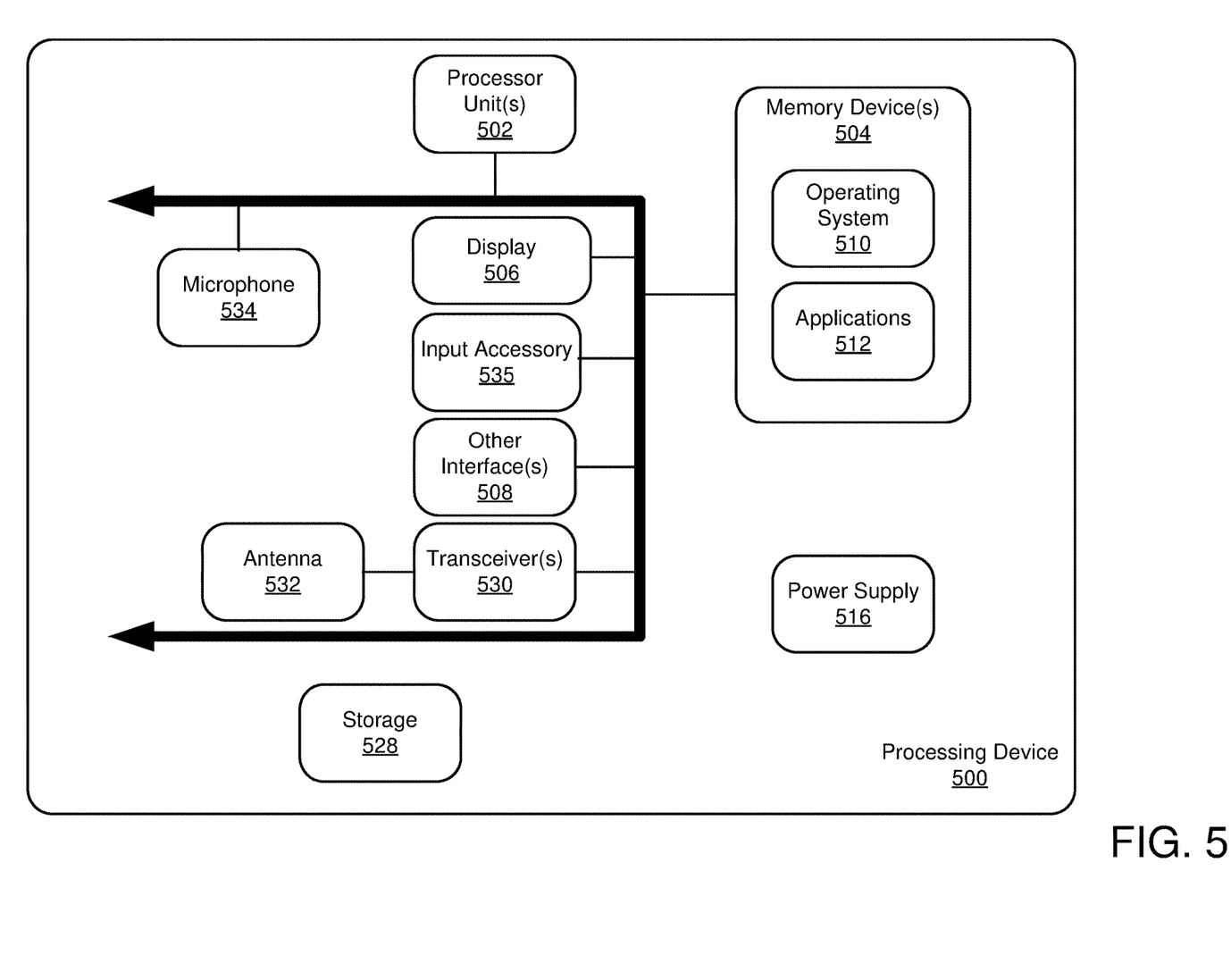
FIG. 5 illustrates an example schematic of a processing device suitable for implementing aspects of the disclosed technology.

FIG. 5 illustrates an example schematic of a processing device 500 suitable for implementing aspects of the disclosed technology. In various implementations, the processing device 500 may represent any one or more of a broadcasting device, spectating device, game controller, or game execution device. The processing device 500 includes one or more processor unit(s) 502, memory 504, a display 506, and other interfaces 508. The memory 504 generally includes both volatile memory (e.g., RAM) and non-volatile memory (e.g., flash memory). An operating system 510, such as the Microsoft Windows® operating system, the Microsoft Windows® Phone operating system or a specific operating system designed for a gaming device, resides in the memory 504 and is executed by the processor unit(s) 502, although it should be understood that other operating systems may be employed.

One or more applications 512, such as the battery cycler 112 of FIG. 1 and battery cycler 300 of FIG. 3, are loaded in the memory 504 and executed on the operating system 510 by the processor unit(s) 502. The applications 512 may receive input from various input devices such as a microphone 534 or input accessory 535 (e.g., keypad, mouse, stylus, touchpad, gamepad, racing wheel, joystick). The processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 430 and an antenna 532 to provide network connectivity (e.g., a mobile phone network, Wi-Fi®, Bluetooth®). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and storage devices 528. Other configurations may also be employed.

In an example implementation, a mobile operating system, various applications (e.g., a battery monitoring application), modules, and services may have hardware and/or software embodied by instructions stored in memory 504 and/or storage devices 528 and processed by the processor unit(s) 502. The memory 504 may be memory of host device or of an accessory that couples to a host.

The processing device 500 may include a variety of tangible computer-readable storage media and intangible computer-readable communication signals. Tangible computer-readable storage can be embodied by any available media that can be accessed by the processing device 500 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information, and which can be accessed by the processing device 500. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example system for extending longevity of a battery comprises a charge interrupt predictor stored in the memory and executable to make a charge interrupt prediction that predicts a likelihood of a power source disconnect event interrupting a current flow to the battery within one or more segments of a future time interval. The system further includes a charge cycle model stored in the memory and executable by the processor to model a charge cycle for the battery within the future time interval, where the charge cycle model includes a charge level reduction to a first target zone prior to a charge level increase to within a second target zone. Still further, the system additionally includes a charge cycling controller stored in the memory and executable to control battery circuitry to charge or discharge the battery in accord with the modeled charge cycle.

In one example system of any preceding system, the charge cycle model implements logic to attempt to maximize a total time that a charge level of the battery is in the first target zone while ensuring that the charge level is within the second target zone each time the battery is actually disconnected from an external power source.

In still another example system of any preceding system, the system further comprises a feedback provider that includes a reinforcement learning algorithm, the feedback provider being executable to identify discrepancies between an ideal charge cycle and an actual charge cycle observed and provide feedback to the charge cycle model that is based on the identified discrepancies.

In yet another example system of any preceding system, the feedback provider is configured to provide feedback based on a discrepancy between a target time in the first target zone and an actual time in the first target zone.

In still another example system of any preceding system, the feedback provider is configured to provide feedback based on a discrepancy between the second target zone and an actual charge level of the battery at the time of the power source disconnect event.

In yet another example system of any preceding system, the feedback provider is configured to provide feedback based on a number of fluctuations in charge level of the battery into and out of the second target zone throughout the actual charge cycle observed.

In another example system of any preceding system, the charge interrupt predictor is configured to predict a specific time of day of the power source disconnect event.

In still another example system of any preceding system, the charge interrupt prediction is based on at least one of device charge history, calendar data, and location data.

In another example system of any preceding system, the system further includes a charge/discharge rate predictor stored in memory and executable to dynamically update predicted charge and discharge rates for the battery based on detected changes in system power parameters, wherein the charge cycle modeler updates the modeled charge cycle responsive to each update to the predicted charge and discharge rates.

An example method for extending longevity of a battery includes determining, with a processor, a charge interrupt prediction that predicts a likelihood of a power source disconnect event interrupting a current flow to the battery within one or more segments of a future time interval. The method further includes determining a charge cycle model for the battery within the future time interval and controlling battery circuitry to charge or discharge the battery in accord with the charge cycle model. The charge cycle model includes a charge level reduction to a first target zone prior to a charge level increase to within a second target zone.

In an example method of any preceding method, determining the charge cycle model is based on modeling logic that attempts to maximize a total time that a charge state of the battery is in the first target zone while ensuring that the charge state is within the second target zone each time the battery is actually disconnected from an external power source. In another example method of any preceding method, the method further includes identifying discrepancies between an ideal charge cycle and the actual charge cycle observed and providing feedback to the charge cycle modeler that is based on the identified discrepancies.

In another example method of any preceding method, the charge cycle model implements logic to maximize total time that the charge level of the battery is in the first target zone while mitigating a number of charge cycles incurred during the future time interval In still another example method of any preceding method, the charge cycle model implements logic to maximize total time that the charge level of the battery is in the first target zone while mitigating a number of charge cycles incurred during the future time interval.

In yet another example method of any preceding method, the charge interrupt prediction is based on at least one of device charge history, calendar data, and location data.

In another example method of any preceding method, the method further includes rendering a new charge interrupt prediction responsive to each detected power source disconnect event.

In another example method of any preceding method, the method further includes dynamically updating predicted charge and discharge rates for the battery based on detected changes to system power parameters and updating the charge cycle model responsive to each change in the predicted charge and discharge rates An example tangible processor-readable storage media encodes instructions for executing a computer process for extending longevity of a battery. The computer process includes determining a charge interrupt prediction that predicts a likelihood of a power source disconnect event interrupting a current flow to the battery within one or more segments of a future time interval and also includes determining a charge cycle model for the battery within the future time interval, where the charge cycle model includes a charge level reduction to a first target zone prior to a charge level increase to within a second target zone. The computer process further includes controlling battery circuitry to charge or discharge the battery in accord with the charge cycle model.

In example tangible processor-readable storage of any preceding processor-readable storage media, determining the charge cycle model is based on modeling logic that attempts to maximize a total time that a charge state of the battery is in the first target zone while ensuring that the charge state is within the second target zone each time the battery is actually disconnected from an external power source.

In still another example tangible processor-readable storage of any preceding processor-readable storage media, the computer process further includes identifying discrepancies between an ideal charge cycle and an actual charge cycle observed and providing feedback to the charge cycle modeler that is based on the identified discrepancies.

In still another example tangible processor-readable storage of any preceding processor-readable storage media, the computer process further includes rendering a new charge interrupt prediction responsive to each detected power source disconnect event.

An example system for extending longevity of a battery includes a means for determining a charge interrupt prediction that predicts a likelihood of a power source disconnect event interrupting a current flow to the battery within one or more segments of a future time interval. The system further includes a means for determining a charge cycle model for the battery within the future time interval and a means for controlling battery circuitry to charge or discharge the battery in accord with the charge cycle model. The charge cycle model includes a charge level reduction to a first target zone prior to a charge level increase to within a second target zone.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed is:

1. A system for extending longevity of a battery comprising:
    a memory device including memory;
    a charge interrupt predictor stored in the memory and executable by a processor to make a charge interrupt prediction, the charge interrupt prediction predicting an interrupt time within a future time interval that a power source disconnect event is most likely to occur, the power source disconnect event interrupting a current flow to the battery;
    a charge cycle modeler stored in the memory and executable by the processor to model a charge cycle for the battery within the future time interval, the modeled charge cycle including a charge level reduction to a first target zone prior to a charge level increase to a second target zone such that a charge level of the battery is within the second target zone at the predicted interrupt time, the first target zone and the second target zone being mutually exclusive and the second target zone being defined to include a range of approximately 90 to 100 percent charge; and
    a charge cycling controller stored in the memory and executable by the processor to control battery circuitry to charge or discharge the battery in accord with the modeled charge cycle.

2. The system of claim 1, wherein the charge cycle modeler implements logic to attempt to maximize a total time that a charge level of the battery is in the first target zone while ensuring that the charge level is within the second target zone each time the battery is actually disconnected from an external power source.

3. The system of claim 1, wherein the charge interrupt predictor is configured to predict a specific time of day of the power source disconnect event.

4. The system of claim 1, wherein the charge interrupt prediction is based on at least one of device charge history, calendar data, and location data.

5. The system of claim 1, further comprising:
    a charge/discharge rate predictor stored in memory and executable by the processor to dynamically update predicted charge and discharge rates for the battery based on detected changes in system power parameters, wherein the charge cycle modeler updates the modeled charge cycle responsive to each update to the predicted charge and discharge rates.

6. The system of claim 1, wherein the system further comprises a feedback provider that includes a reinforcement learning algorithm, the feedback provider executable by the processor to:
identify discrepancies between an ideal charge cycle and an actual charge cycle observed; and
provide feedback to the charge cycle model that is based on the identified discrepancies.

7. The system of claim 6, wherein the feedback provider is configured to provide feedback based on a discrepancy between a target time in the first target zone and an actual time in the first target zone.

8. The system of claim 6, wherein the feedback provider is configured to provide feedback based on a discrepancy between the second target zone and an actual charge level of the battery at the time of the power source disconnect event.

9. The system of claim 6, wherein the feedback provider is configured to provide feedback based on a number of fluctuations in charge level of the battery into and out of the second target zone throughout the actual charge cycle observed.

10. A method for extending longevity of a battery, the method comprising:
determining-a charge interrupt prediction, the charge interrupt prediction predicting an interrupt time within a future time interval that a power source disconnect event is most likely to occur, the power source disconnect event interrupting a current flow to the battery;
determining a charge cycle model for the battery within the future time interval, the charge cycle model including a charge level reduction to a first target zone prior to a charge level increase to a second target zone such that the battery is within the second target zone at the predicted interrupt time, the first target zone and the second target zone being mutually exclusive and the second target zone being defined to include a range of approximately 90 to 100 percent charge; and
controlling battery circuitry to charge or discharge the battery in accord with the charge cycle model.

11. The method of claim 10, wherein the charge interrupt prediction is based on at least one of device charge history, calendar data, and location data.

12. The method of claim 10, further comprising:
rendering a new charge interrupt prediction responsive to each detected power source disconnect event.

13. The method of claim 10, further comprising:
dynamically updating predicted charge and discharge rates for the battery based on detected changes to system power parameters; and
updating the charge cycle model responsive to each change in the predicted charge and discharge rates.

14. The method of claim 10, wherein determining the charge cycle model is based on modeling logic that attempts to maximize a total time that a charge level of the battery is in the first target zone while ensuring that the charge level is within the second target zone each time the battery is actually disconnected from an external power source.

15. The method of claim 14, wherein the method comprises:
identifying discrepancies between an ideal charge cycle and the actual charge cycle observed; and
providing feedback to the modeling logic that is based on the identified discrepancies.

16. The method of claim 14, wherein the modeling logic implements logic to maximize total time that charge level of the battery is in the first target zone while mitigating a number of charge cycles incurred during the future time interval.

17. One or more tangible processor-readable storage media encodes instructions for executing a computer process with one or more processors for extending longevity of a battery, the computer process comprising:
determining-a charge interrupt prediction, the charge interrupt prediction predicting an interrupt time within a future time interval that a power source disconnect event is most likely to occur, the power source disconnect event interrupting a current flow to the battery;
determining a charge cycle model for the battery within the future time interval, the charge cycle model including a charge level reduction to a first target zone prior to a charge level increase to a second target zone such that a charge level of the battery is within the second target zone at the predicted interrupt time, the first target zone and the second target zone being mutually exclusive and the second target zone being defined to include a range of approximately 90 to 100 percent charge; and
controlling battery circuitry to charge or discharge the battery in accord with the charge cycle model.

18. The one or more tangible processor-readable storage media of claim 17, wherein the computer process further comprises:
rendering a new charge interrupt prediction responsive to each detected power source disconnect event.

19. The one or more tangible processor-readable storage media of claim 17, wherein determining the charge cycle model is based on modeling logic that attempts to maximize a total time that a charge level of the battery is in the first target zone while ensuring that the charge level is within the second target zone each time the battery is actually disconnected from an external power source.

20. The one or more tangible processor-readable storage media of claim 19, wherein the computer process further comprises:
identifying discrepancies between an ideal charge cycle and an actual charge cycle observed; and
providing feedback to the modeling logic that is based on the identified discrepancies.

* * * * *